Patented Nov. 18, 1941

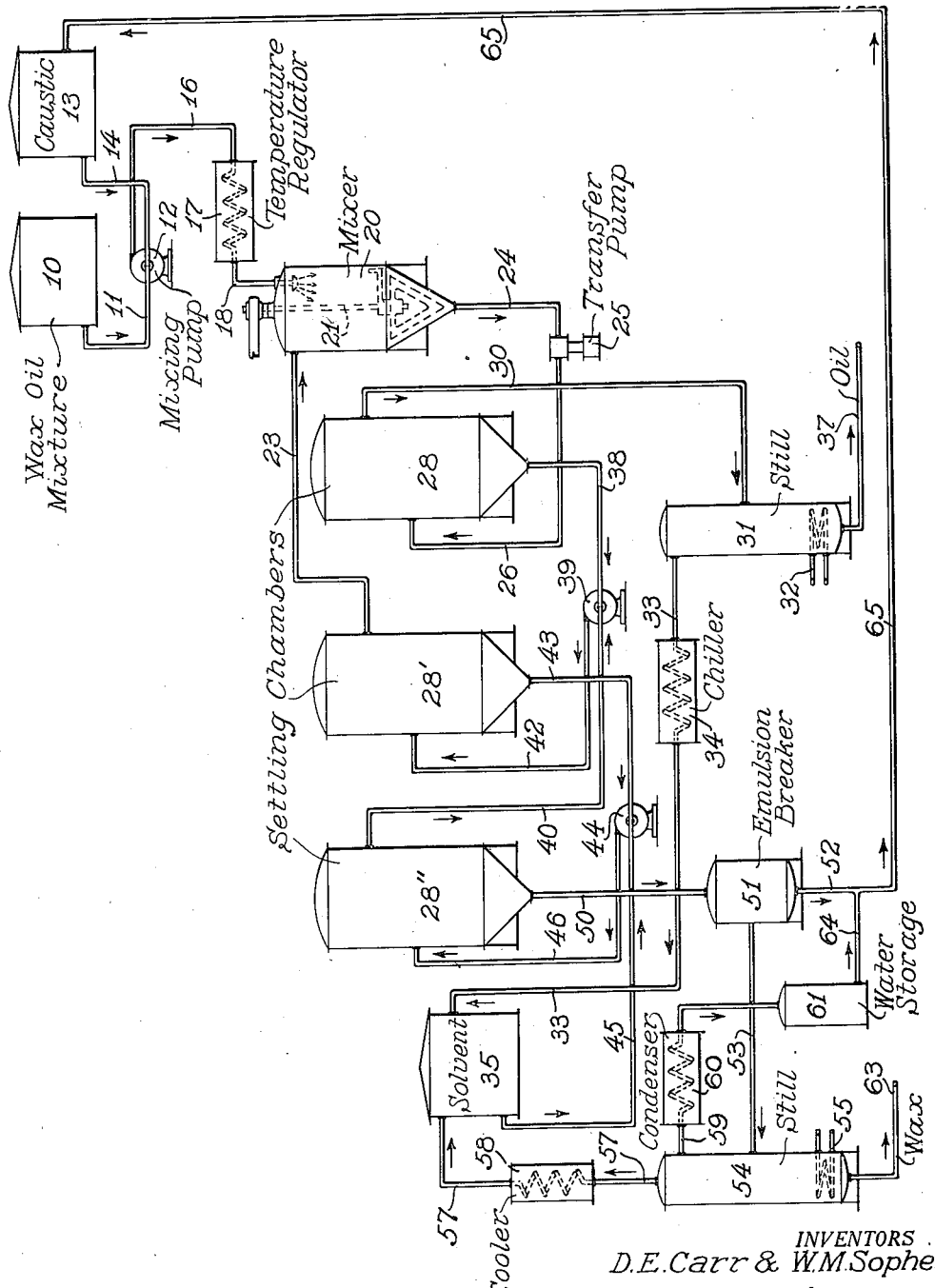

2,263,535

UNITED STATES PATENT OFFICE 2,263,535

EMULSION PROCESS FOR DEOILING AND DEWAXING

Donald E. Carr and William M. Sopher, Long Beach, Calif., assignors to Union Oil Company of California, Los Angeles, Calif., a corporation of California Application December 23, 1936, Serial No. 117,290
Renewed February 25, 1939

15 Claims. (Cl. 196—18)

The present invention relates to the separation of oil and wax, and more particularly pertains to a method wherein a mixture of oil and wax is emulsified, suspended or otherwise dispersed and is then separated into its constituent parts by means of a solvent adapted to remove the oil. The method may be used either as a dewaxing process for removing wax from a waxy oil or as a deoiling process for removing oil from an oily wax.

Conventional dewaxing processes involve chilling the waxy oil until the wax solidifies as crystals in the oil, and then removing the wax by settling, filter pressing, or centrifuging. Solvents and/or diluents may or may not be added to effect a cleaner and more rapid separation of wax from the oil.

The paraffin waxes so obtained have associated with them a considerable proportion of oil and of low melting point waxes. To eliminate this oil, the waxes are customarily subjected to "seating" processes, in which the oily wax is cooled below its melting point and then the temperature is slowly raised to allow the oil to drain out of the crystalline wax. The facility and success of such operations depend to a large extent upon the crystalline character of the wax, large needle-shaped crystals favoring the separation by affording vertical passages through which the oil and melted soft paraffin may drain. Even with the most favorable crystal formation the separation is not rapid, and when the crystal formation is unfavorable as when it forms a solid, packed structure with no passages for drainage, the operation is slow, tedious and generally inefficient.

It is the main object of the present invention to provide a method for separating oil and wax in which there is rapid establishment of equilibrium and consequent rapid and clean separation of oil and wax. It is a further object of the invention to provide a method which lends itself readily to continuous operation.

It has been discovered that these objects may be accomplished by forming a dispersion, emulsion or suspension of the oil-wax mixture preparatory to separation of this mixture with its constituent fractions, and it has been further discovered that wax and oil in such dispersed state may be readily separated by washing the dispersion, emulsion, or suspension with a solvent.

Although applicants do not wish to limit themselves to any one theory of the case, it is believed that the increased speed and efficiency in separating oil and wax by this method results from having the wax and oil particles separated or dispersed one from another. In conventional methods of separating oil and wax, the wax occurs in a form in which solvation or occlusion of oil and/or solvent in the crystal agglomerates makes the complete removal of oil slow and laborious. The wax crystalline structure may also be so compact and laminated that rapid draining or washing of the oil from the wax is impossible. However, by emulsifying or otherwise dispersing the oil and wax in accordance with the present invention, an open disjoined structure is obtained such that the separation is greatly facilitated. Because the particles are separated one from another, the solvent may more readily penetrate thereinbetween and wash out the oil from the wax.

The present invention, therefore, broadly stated, resides in emulsifying, suspending, or otherwise dispersing a mixture of oil and wax, and in extracting the oil from the dispersed wax with a hydrocarbon or other suitable solvent. Specifically stated, the invention comprises emulsifying a mixture of oil and wax at a temperature conveniently above its solidification point, cooling the emulsion to a temperature slightly below the solidification point of the wax, and contacting it with a solvent adapted to remove the oil. Still more specifically stated, it comprises commingling an oil-wax mixture with a sufficient quantity of aqueous alkali solution to produce a dispersion of the type more fully described hereinbelow, cooling said emulsion or dispersion to a temperature slightly below the solidification point of the wax, and contacting it with preferably prechilled solvent of the class including light naphtha, in order to remove the oil. The solvent leaches the oil from the emulsion or suspension, and when allowed to settle the mixture separates into phases comprising a clear supernatent solution of oil and solvent, and a fairly fluid lower layer containing the emulsified wax and a small amount of solvent. In this fluid state the wax can be withdrawn and pumped as required for continuous operation. The solvent phase containing the extracted oil may be topped to remove the solvent and to recover the substantially or completely wax-free oil. For purposes of deoiling, the emulsified wax, after separation from the layer of oil and solvent, may be subjected to one or more additional washings with solvent in order to completely remove the oil. It may then be treated to break the emulsion and to recover the deoiled wax. This is accomplished by neutralizing the caustic, if caustic were used as the emulsifying agent, with a mineral acid such as sulphuric acid, by heating, or by any of the known methods of breaking emulsions. The aqueous layer is separated, and any residual solvent and water is removed from the wax as by topping. Asphaltic sludge or resins which have been carried along in the process and which are insoluble in deoiled wax will settle to the bottom when the wax is melted and may be removed as a lower phase. If desired, the wax may then be acid and clay treated in the usual manner.

An essential feature of the present invention resides in preparing the oil-wax mixture for separation of oil from wax. This is accomplished by dispersing the oil-wax mixture prior to the leaching operation. In this dispersed state, the particles are discrete and the structure sufficiently open and accessible to permit ready treatment for separation of the oil-wax mixture into its component parts. There is also the added advantage of fluidity of the mixture which permits operation of the process on a continuous basis. While these advantages may be achieved by dispersing the oil-wax mixture in any of a number of ways, it has been found desirable from the standpoint of ease of handling and efficiency of operation to use dispersions which are fairly fluid, and yet which are stable to moderate agitation, and which afford free surfaces of oily wax upon which the solvent may act. Obviously, particles of oily wax completely and firmly surrounded by dispersive medium cannot be reached by the solvent and so leached of their oil. On the other hand, a true water-in-oil type of emulsion (the term "oil" as used herein referring of course to the mixture of oil and wax) may present difficulties in the way of excessive tackiness and a failure to disperse well in the solvent.

Microscopic investigations have indicated that the types of dispersions best suited for this purpose comprise the complicated multiple phase emulsions in which the dispersed phase itself contains globules of the other phase. Such emulsions may occur because of a selective wetting action of the dispersing medium for the wax crystals, as the result of the presence in the system of two emulsifying agents of different types, on account of a partial inversion in emulsion type, or for other reasons. For instance, a water-in-oil type emulsion, which emulsion is in turn loosely emulsified in water, is suitable. Another suitable system is one in which the oil-wax particles are wetted with but not completely surrounded by the dispersive medium. A still further type of emulsion suitable for solvent extraction or deoiling comprises an emulsion, which, although initially of the oil-in-water type, is partially inverted during the extraction, due either to conditions of emulsification and handling or to the addition of flocculating or emulsion modifying agents.

In preparing the dispersions of the above described types various mechanical means may of course be resorted to, such as high speed stirring, pumping through turbulent zones, or use of a colloid mill. Also, various aqueous and non-aqueous solvents including water alone, solutions of water-soluble acids, bases, or salts, glycols, glycerin, alcohol and the like, may be used as suspending or emulsifying mediums. Furthermore, various agents may be added as emulsifying agents or emulsion stabilizers. As such may be mentioned proteins such as gelatins, albumens, casein, etc., pectins comprising the various gels, polysaccharides and hemicelluloses including starches, gums, tannins, clays, and soaps, such as soaps of rosin oil, oleic acid, Turkey red oil, etc., which soaps may be either preformed or formed in situ. Di- and tri-ethanolamine resinates have been found especially useful as addition agents to increase the fluidity or stability of the emulsion. The addition of such agents either to the mixture of oil and wax before it is emulsified or to the resulting emulsion have been found to have a beneficial effect especially in preventing the breaking of the emulsion during extraction with the solvent. Furthermore, it may be desirable to provide for inversion or other modification of the emulsion type. For this purpose various agents, such as acids, calcium and alkaline earth soaps, finely divided solids including asphalt, lamp black, etc., may be added.

Preferably emulsification should take place in the temperature range between the solidification point of the wax and about 175° F. At higher temperatures stable water-in-oil type emulsions are formed which do not disperse well in the solvent during the subsequent separation or washing step. For most mixtures of oil and wax an emulsifying temperature of 150° F. will be found suitable.

If desired, in order to reduce the viscosity of the resulting emulsion, the mixture of oil and wax may be prediluted with a small amount of solvent prior to emulsification. For instance, a mixture of oil and wax is mixed with approximately an equal volume of solvent miscible with it at a temperature above the solidification point. An emulsion stabilizing agent, such as 1% tri-ethanolamine resinate, may be added to the initial wax-oil mixture or to it after dilution with solvent. To this mixture is added an approximately equal volume of 1 to 3% caustic soda solution at a temperature above the cloud point of the solvent-wax-oil mixture, and the whole is agitated vigorously to produce emulsification. The resulting emulsion may then be cooled to about 75-100° F. before adding solvent for the washing step.

Another embodiment of the invention as it relates particularly to the preparation of the oily wax in a dispersed state prior to deoiling may be described as follows: The wax to be deoiled is heated to a temperature above its melting point, such as between 135° F. and 175° F. To the melted wax is added an appropriate volume of dilute caustic soda solution (1° to 5° Baumé), which according to the type of wax treated may vary from about 20 to 50% of the total solution. The temperature of the caustic solution is approximately that of the melted wax, i. e. 135° to 175° F. This mixture is agitated as by circulation through a gear pump until intimate commingling has taken place. The emulsion so formed is cooled, without further agitation, until a temperature of about 120° F. is reached at which the viscosity of the mixture increases because of the solidification of the wax.

Emulsions prepared in either of these ways are sufficiently fluid to be readily handled in a continuous process. They are sufficiently stable to withstand pumping without breaking and are easily dispersed in solvent and readily extracted. Such emulsions settle rapidly and may be readily broken by agitation to recover the deoiled wax.

The purpose of emulsifying the oil-wax mixture is, of course, to prepare it for deoiling or dewaxing, depending on whether the process is used for the removal of oil from oily wax, or of wax from waxy oil. This is accomplished by washing the dispersion with a solvent. There are many solvents which are suitable for this purpose, and we do not restrict ourselves to the use of any one solvent or type of solvent. Naphtha, gasoline, casinghead gasoline and other light petroleum fractions may be used. Also, various light hydrocarbons are suitable, including liquid propane, butane, pentane, hexane, etc., or the mixture of these materials with each other or with petroleum fractions. Any material known to have a selective solvent action for oil, such as benzol, benzol-acetone mixture, carbon tetrachloride, trichlor-ethylene, ethylene dichloride, etc., may be employed.

In choosing a solvent, or a mixture of solvents, it may be advantageous to choose one which has a preferential solvent action between oil and wax at the temperature of extraction. In the usual sweating or dewaxing operation, the oil separated from the wax dissolves a considerable amount of wax therein, whereas by separating oil and wax according to the method of this invention a selective extraction of oil and not of wax is possible. Such operation provides for cleaner separation of oil and wax and avoids the disadvantages incident to solution of wax in the oil and subsequent recrystallization.

In washing the dispersed mixture of oil and wax, it has sometimes been found desirable to use a solvent, the temperature of which is lower than that of said dispersed oil-wax mixture. One procedure, which is advantageous in increasing the stability of the dispersion and avoiding solution and subsequent reprecipitation of wax in non-settling form comprises prechilling the solvent to about 35° F. and introducing the oil-wax emulsion thereinto at a temperature of about 120° F. This method of preparing the emulsion for extraction is also advantageous in improving the settling rates of the emulsion and solvent mixture. Local overheating during the initial mixing of the emulsion and cool solvent may be avoided by using a solvent enriched with sufficient light hydrocarbon to take care of any necessary cooling requirements by vaporization of a portion of the diluent. Although a mixture of butane with pentane or casinghead gasoline has proved satisfactory, obviously other mixtures will accomplish the same purpose. Furthermore, the cooling may be accomplished by indirect chilling.

The washing operation comprises mixing solvent with the suspension of oil and wax, agitating the mixture and allowing it to settle and separate into layers, and then removing the resulting solvent and extracted oil layer as by decantation. One or more washings of the emulsified mixture with solvent may be employed to remove the oil from the wax. If the oil-wax emulsion has been carefully prepared, it will be found sufficiently stable that it can be repeatedly re-extracted with solvent without de-emulsifying. In batch operations, four or five extractions are usually found sufficient to result in substantially complete separation of oil and wax. If the operation is carried out in a continuous manner, the number of stages will approximate that necessary in solvent refining of lubricating oil to remove sludge forming or low viscosity index constituents. However, this invention is not restricted to any fixed number of extractions, to any given solvent ratio, nor to any set temperatures of emulsification and extraction as these may vary widely according to the type of stock being treated, its oil and wax content, the results desired, the solvent used, etc. For instance, it may be desired to operate the process to effect a separation of deoiled wax into low and high melting wax fractions. This may be accomplished by operating at somewhat higher temperatures than would be used to remove oil from wax, or by a suitable choice of solvent.

The above described features of the invention may be understood more fully from the examples described hereinbelow:

*Example 1*

One and one-half liters of a wax-oil mixture having an oil content of 50% by the acetone-benzol method, and a melting point of 135° F. (Ubbelohde) was heated to a temperature of 180° F. and added to 1500 ml. of 3° Baumé caustic soda solution at a temperature of 130° F. The resulting temperature of the mixture was 148° F. This mixture was circulated through a gear pump until the temperature dropped to 136° F., at which point the viscosity increased due to the solidification of the wax. It was then allowed to stand without stirring until it had cooled to a temperature of 110° F. to 115° F. One liter of casinghead gasoline having a gravity of 70° A. P. I. and a boiling range between 100–200° F. was then added at about 110° F. for the purpose of diluting the emulsion. The cooled emulsion was then made into a slurry by circulating it through a gear pump. The diluted suspension of the wax was then withdrawn and commingled with three times its volume of a mixture of casinghead gasoline and butane adjusted to boil at 33° to 34° F., the butane being added to act as a refrigerant and prevent solution of the wax. The wax was allowed to settle, the clear solvent layer was decanted, and the semi-liquid wax layer was again dispersed in fresh solvent. This procedure was repeated until five washes had been given the wax, a total of 1820 volume per cent of solvent on the basis of the emulsion being used. This is equivalent to 3640 volume per cent of solvent on the basis of the volume of wax present in the emulsion.

The resulting deoiled wax was freed from resins and acid and clay treated to yield a 165° F. melting point water-white wax. The final product constituted about 70% of the wax of that grade theoretically contained in the original oily wax.

Although the above example employed five separate solvent washings, a lesser number of extractions may be sufficient or even desired if the requirements of the final product are different or if it is unnecessary to remove the last traces of oil.

*Example 2*

A wax-oil mixture of 133° F. melting point and 55% oil content was emulsified by agitation with an equal volume of 3° Baumé caustic soda. The resulting emulsion was poured into four volumes of pentane at 30 to 35° F. and vigorously agitated. When the mixture was allowed to settle for 15 minutes, a sharply defined emulsion layer separated as a bottom phase and a clear layer at the top. The supernatant phase was decanted off, and three more washes of cold pentane were applied to the now quite fluid emulsion phase. The emulsion was then heated to remove solvent and water, and a wax of approximately 165° F. melting point was recovered. This wax appeared to be completely oil-free.

*Example 3*

A quantity of a wax-oil mixture was emulsified with 100 volume percent of 3° Baumé caustic soda solution by agitation at 180° F. The dispersion was allowed to cool to 120° F. at which temperature the agitation was discontinued and the dispersion allowed quietly to cool to about 100° F. This cooled dispersion was commingled with four volumes of pentane at 30° F. and allowed to settle for a period of fifteen minutes at which time the quantity of settled, deoiled wax was measured.

As a comparison the same wax after heating to 180° F. and cooling to 100° F. but without any emulsification or dispersion as described above, was thoroughly commingled with the same solvent maintained at approximately 32° F. As with the preceding example, the mixture was allowed to stand for fifteen minutes and then the quantity of wax settled during that period of time was measured. It was found that the rate of settling of the deoiled wax increased some fifteen times when it was in an emulsified state.

*Example 4*

A petroleum distillate, produced by vacuum distillation of a paraffinic or mixed-base crude oil having a viscosity of approximately 125 seconds Saybolt Universal at 210° F. containing approximately 10% of wax and having a pour point of 110° F., was diluted with an equal volume of petroleum ether. The mixture was emulsified by agitating with a volume of 3° Baumé caustic soda solution equal to the combined volume of the oil and petroleum ether. A small amount of triethanolamine (approximately 1%) added as an emulsion stabilizing agent and approximately 5% by volume of ethyl alcohol was added to the mixture in order to reduce the freezing point of the aqueous phase. The emulsion was extracted at a temperature between 5° and 10° F. with 300 volume percent of petroleum ether. After settling the layer comprising solvent and extracted oil was withdrawn and topped to remove the solvent. The resulting oil had a pour point of about 40° F. and showed no wax cloud at room temperature.

Although batch processes have been described in the examples cited above, the invention may also be carried out in a continuous manner, a typical embodiment of which is shown diagrammatically on the accompanying drawing. The single figure of said drawing discloses a structure for a three-stage continuous countercurrent separation of a wax-oil mixture. Referring more particularly to the drawing, the wax-oil mixture to be treated is conveyed from tank 10 through line 11 to a mixing device 12, wherein the mixture is thoroughly commingled with an aqueous solution containing an emulsifying agent, such as caustic alkali conveyed to said mixer from tank 13 through line 14. The dispersion thus produced is then conveyed through a line 16 to a temperature regulating device 17. In this temperature regulator, the emulsion is cooled from a temperature of about 150° F. (the temperature at which it was produced) to a temperature of about 120° F. The cooled emulsion is then conveyed through line 18 into a mixer 20. Herein it is thoroughly commingled, as by a mixing device 21, with the solvent entering mixer 20 through line 23, this solvent coming from a source described more fully hereinbelow. The solvent-emulsion mixture is then withdrawn through line 24 and conveyed by pump 25 through line 26 and into first separator or settling device 28. The mixture introduced into settler 28 is permitted to separate into two phases. The upper phase comprises most of the solvent together with a part of the oil removed by said solvent from the wax emulsion. This oil containing solvent is then withdrawn through line 30 and may be conveyed for purposes of recovery of solvent to a still 31, heated as by means of a coil 32. The solvent vapors are removed from still 31 through line 33 and may be conveyed, after suitable liquefaction as by chilling in 34, to the solvent storage tank 35. The residual oil is then withdrawn from still 31 through line 37.

The wax emulsion, partially deoiled in settler 28, is withdrawn through line 38 and conveyed to a mixer 39 wherein it is again thoroughly commingled with a solvent entering said pump through line 40 and as shown in the drawing, coming from the last settling stage. The solvent-emulsion mixture thus produced at 39 is then conveyed through line 42 to the second of the settling stages herein referred to by the numeral 28'. As in the first settling chamber 28, the mixture introduced into 28' separates into two phases. The upper phase contains the solvent and additional quantities of oil not extracted during the first washing operation. This solvent is then conveyed through line 23 to be commingled in mixer 20 with the freshly prepared quantities of wax emulsion to be washed, as this has been described hereinabove. The wax emulsion partially deoiled for the second time is then withdrawn from settler 28' through line 43 and again conveyed to a mixer 44, wherein it is commingled with fresh solvent coming from tank 35 through line 45. The mixture is then conveyed through line 46 into the third settling chamber 28''. The solvent containing the oil removed from the emulsion is then removed from this settler and, as stated above, is conveyed to mixer 39 to be commingled with the wax emulsion being conveyed from the first separator or settling chamber to the second one.

The deoiled wax emulsion is withdrawn from the last separator and conveyed through line 50 to unit 51 wherein the emulsion is broken as by heating, agitation, dilution or any other equivalent means described herein. The caustic is then removed through line 52, while the wax containing water and solvent entrained therein is conveyed through line 53 to a fractionator 54 which may be heated as by means of a coil 55. The solvent is withdrawn through 57, liquefied in 58, and returned to solvent storage 35. The water evaporated in 54 is withdrawn through line 59 condensed in 60 and conveyed to storage tank 61. The deoiled wax is continuously or interruptedly withdrawn from the bottom of fractionator 54 through line 63. If desired, and as shown in the drawing, the water thus recovered and stored in 61 may be withdrawn therefrom through line 64, commingled with the caustic passing through line 52, and conveyed through line 65 to tank 13 to be again used for emulsification of fresh quantities of wax, or waxy oil.

In countercurrent operation, fresh solvent being added into the system is introduced into the last stage, while the wax-oil emulsion is put into the first stage. Thus, the emulsion going to each succeeding stage is first mixed with the solvent coming from each next succeeding stage. Although the above continuous countercurrent operation has been described in connection with a system having three separate settling chambers, it is obvious that the operation can be also carried out using any number of chambers or in a continuous manner by the use of a single tower in which the washing is carried out as in known continuous countercurrent operations.

An emulsion at approximately 75–100° F. prepared as described hereinabove, may be contacted with solvent in a suitable chilled tower with means for extracting sensible heat from the emulsion as it is introduced near the top of the tower, the solvent being introduced near the bottom. Suitable distributor plates or mixing devices and/or proper filling material may be provided at intervals along the length of the column in order to facilitate the solvent equilibrium at the temperature used. Oil-free wax in emulsified form is drawn off the bottom of the tower and a solution of wax-free oil at the top.

*Example 5*

The following is an example of a continuous deoiling operation according to our process.

A quantity of oily wax containing 0.1% by weight of triethanolamine resinate was dissolved in one volume of cleaners' naphtha at 150 to 160° F. This solution was then emulsified by pouring it into two volumes of 3° Baumé caustic soda solution at 150 to 160° F., contained in a seven gallon capacity vessel equipped with steam-heating coils, water-cooling coils, and a high-speed electrically-driven stirrer. The mixture was stirred for ten minutes and water was then run through the cooling coils, the stirring being continued until the emulsion temperature had dropped to 80 to 90° F. The emulsion was then drawn by gravity flow into a calibrated charging pot. The charging pot was connected with a small gear pump which forced the emulsion at any desired rate through approximately 15 feet of ⅜ in. copper tubing immersed in a bath maintained at 30 to 34° F. The emulsion leaving this cooling line was mixed with the casinghead gasoline-oil extract from the second stage of the extraction apparatus in the intake line of a second gear pump which forced the mixture through another 15 feet of copper tubing in the cooling bath into an elevated air-liquid separator from which it flowed by gravity into the first stage of the extraction apparatus.

Casinghead gasoline having a vapor pressure of 14 pounds per square inch was used as the extracting solvent. This solvent was cooled to 30 to 34° F. by passage through a brine-jacketed line before it was discharged into the fourth and last stage of the extraction apparatus. Between each stage of the extraction apparatus was a three liter capacity brine-jacketed vessel in which the emulsion in each stage was mixed with the extract from the previous stage before being pumped to the proper settling stage.

The following tabulation shows the amounts of material charged into the continuous equipment during forty-three hours of running and the amount of deoiled wax recovered during this period:

Weight of wax charged_____pounds__ 67.57
Volume (extrapolated to 60° F. of wax charged) _____liters__ 32.99
Volume of emulsion charged_____liters__ 132.5
Volume of casinghead gasoline charged liters__ 551.0
Volume ratio, casinghead gasoline to emulsion _____ 4.15
Volume ratio, casinghead gasoline to wax_ 16.7
Weight deoiled wax recovered___pounds__ 10.29

An 800-gram sample of the partially settled wax was given a 50 pound per barrel treat with 98% acid, the acid being added in two portions. The first portion was a ten pound per barrel dump at 210° F. to remove the asphalt which it did very effectively, the sludge produced being very hard. The remainder of the acid was added as a forty pound per barrel dump at 185 to 190° F. The sludge was soft and settled very quickly. Six hundred and forty six grams of sludge-free wax was recovered. This acid wax was then given a 10% Filtrol treat at 400 to 415° F. and filtered hot through paper and a Super-Cel pre-coat. Filtration was very rapid.

The tests on the crude wax charged and the products recovered are as follows:

| | Initial oily wax | Untreated deoiled wax | Acid treated (50 lb./bbl.) clay treated (10% filtrol) deoiled wax | Oil recovered from casinghead gasoline extract |
|---|---|---|---|---|
| Gravity, °API | 20.1 | 32.0 | 37.3 | 15.3 |
| Melting point (Ubbelhode), °F | 131 | | 161 | |
| Melting point (A. S. T. M.) | | | 161.2 | |
| Melting point (Galician), °F | 134 | 160 | 162 | |
| Wax, percent (acetone-benzene) | 39.2 | | 99.0 | 30.0 |
| Color, N. P. A | Opaque | Opaque | 1¾ | Opaque |

Although the foregoing countercurrent systems are described primarily as deoiling operations, it is obvious that similar structures, either in the form of a single countercurrent system or one employing several settling chambers, could be employed for dewaxing of waxy oils.

If desired, a waxy oil may be treated by the process of the invention to accomplish first a dewaxing of the oil and then a deoiling of the removed wax. The combined operation may be realized in a continuous system, as, for example, by first taking a waxy oil, emulsifying said waxy oil as described more fully hereinabove, commingling the dispersion with a solvent to cause a major separation between the oil and the wax (which wax may yet contain an appreciable quantity of oil dissolved or occluded therein), separating the wax emulsion or dispersion, and then deoiling said dispersion by one of the methods described hereinabove. In such an operation, the degree of fractionation or extraction realized in the separate steps is obviously subject to control in accordance with economic considerations, such as solvent requirements and value of the materials handled.

The terms "emulsion," "dispersion," or "suspension," as employed herein, are used substantially synonomously to denote the mixture of oil and wax and dispersing medium, either with or without added stabilizing or modifying agents, which are produced by the process or processes described hereinabove.

It is to be understood that the above descriptions are merely illustrative of preferred embodiments of our invention of which many variations may be made within the scope of the following claims by those skilled in the art without departing from the spirit thereof.

We claim:
1. A method for separating wax and oil from a mixture containing the same which comprises forming an emulsion of said wax-oil mixture and an emulsifying liquid in which the wax is in the solid state, commingling the emulsion containing the wax in the solid state with a wash liquid adapted to remove oil present in the emulsion and separating the wash liquid and oil from the emulsion containing the wax.
2. A method for separating wax from a wax-oil mixture which comprises forming an emulsion of said wax-oil mixture and an emulsifying liquid in which the wax is in the solid state, washing said emulsion containing the wax in the solid state with a wash liquid to remove oil from said emulsion, separating wash liquid and liquid oil from said emulsion and separating the oil from the thus separated wash liquid and oil.

3. A method for separating wax and oil from a mixture containing the same which comprises emulsifying said wax-oil mixture and an emulsifying liquid, cooling said emulsion, commingling the cooled emulsion with a wash liquid adapted to remove oil present in the emulsion and separating the wash liquid and oil from the emulsion containing the wax.

4. A method for separating wax from a wax-oil mixture which comprises emulsifying said wax-oil mixture and an emulsifying liquid, cooling said emulsion to a temperature sufficiently low to precipitate wax, washing said cooled emulsion with a wash liquid to remove oil from said emulsion, separating wash liquid and liquid oil from said emulsion and separating the oil from the thus separated wash liquid and oil.

5. A method for separating wax from a wax-oil mixture which comprises emulsifying said wax-oil mixture and an emulsifying liquid to form a complex emulsion of the oil-in-water type containing globules of emulsions of the water-in-oil type, washing said emulsion with a wash liquid to remove oil from said emulsion, separating wash liquid and liquid oil from said emulsion and separating the oil from the thus separated wash liquid and oil.

6. A method of separating wax and oil from a mixture containing the same which comprises emulsifying said oil-wax mixture and an emulsifying liquid, commingling the emulsion with a solvent to dissolve the oil present in the emulsion and separating the solvent solution of oil from the emulsion containing the wax.

7. A method according to claim 6 in which the emulsifying liquid contains an alkali.

8. A method according to claim 6 in which the emulsifying liquid contains a soap.

9. A method of separating wax and oil from a mixture containing the same which comprises emulsifying said oil-wax mixture and an emulsifying liquid and thereby forming an emulsion, cooling said emulsion, commingling the cooled emulsion with a cooled solvent to dissolve the oil present in the emulsion and separating the solvent solution of oil from the emulsion containing the wax.

10. A process according to claim 9 in which the emulsion is cooled to a temperature sufficiently low to solidify the wax.

11. A method according to claim 9 in which the solvent is cooled prior to its being commingled with the emulsion.

12. A method according to claim 9 in which the solvent is cooled to a lower temperature than the temperature of the emulsion.

13. A method of separating wax and oil from a mixture containing the same which comprises diluting the wax-oil mixture with naphtha, mixing the diluted waxy oil with an aqueous solution containing an emulsifying agent and thereby forming an emulsion, cooling the emulsion, commingling the emulsion with a cooled solvent to dissolve the oil present in the emulsion and separating the solvent solution of oil from the emulsified wax.

14. A process according to claim 13 in which the solvent is cooled to a temperature lower than the temperature of the emulsion.

15. A method of separating wax and oil from a mixture containing the same which comprises diluting said wax-oil mixture with naphtha, mixing the diluted oil with soap and an alkali and thereby forming an emulsion, cooling the emulsion, commingling the cooled emulsion with an oil solvent cooled to a temperature lower than the temperature of the emulsion to dissolve the oil present in the emulsion and separating the solvent and dissolved oil fractions from the emulsion containing the wax.

DONALD E. CARR.
WILLIAM M. SOPHER.